United States Patent [19]
Lo et al.

[11] Patent Number: 5,801,812
[45] Date of Patent: Sep. 1, 1998

[54] 3D PHOTOGRAPHIC PRINTER USING A DIGITAL MICRO-MIRROR DEVICE FOR EXPOSURE

[75] Inventors: Allen Kwok Wah Lo, Dunwoody, Ga.; Kenneth Quochuy Lao, Westfield, N.J.

[73] Assignee: Image Technology International, Inc., Norcross, Ga.

[21] Appl. No.: 843,677

[22] Filed: Apr. 10, 1997

Related U.S. Application Data

[63] Continuation-in-part of Ser. No. 682,106, Jul. 17, 1996, which is a continuation-in-part of Ser. No. 602,663, Feb. 16, 1996, abandoned, and Ser. No. 418,016, Apr. 6, 1995, Pat. No. 5,572,633, each is a continuation-in-part of Ser. No.333, 201, Nov. 2, 1994, Pat. No. 5,583,971, which is a continuation-in-part of Ser. No. 1,025, Jan. 9, 1993, abandoned, said Ser. No. 602,106, is a continuation-in-part of Ser. No. 349,481, Dec. 2, 1994, Pat. No. 5,625,435, which is a continuation-in-part of Ser. No. 140,681, Oct. 21, 1993, abandoned.

[51] Int. Cl.$^6$ .................................................. G03B 27/32
[52] U.S. Cl. ................................................ 355/22; 355/33
[58] Field of Search ................................. 349/2, 4, 5, 7, 349/15; 353/7; 359/463, 468, 470, 475, 458; 396/329, 330, 333; 348/46, 50, 51, 54, 55; 355/22, 33, 34

[56] References Cited

U.S. PATENT DOCUMENTS

| | | | |
|---|---|---|---|
| 4,896,210 | 1/1990 | Brokenshire et al. | 358/88 |
| 4,903,069 | 2/1990 | Lam | 355/22 |
| 5,019,855 | 5/1991 | Lam | 355/22 |
| 5,028,950 | 7/1991 | Fritsch | 355/22 |
| 5,278,608 | 1/1994 | Taylor et al. | 355/22 |
| 5,408,294 | 4/1995 | Lam | 355/22 |
| 5,455,689 | 10/1995 | Taylor et al. | 358/450 |
| 5,467,204 | 11/1995 | Hatano et al. | 358/482 |
| 5,519,794 | 5/1996 | Sandor et al. | 382/285 |
| 5,528,420 | 6/1996 | Momochi | 359/463 |
| 5,539,487 | 7/1996 | Taguchi et al. | 354/115 |
| 5,624,172 | 4/1997 | Yamagishi | 353/98 |

*Primary Examiner*—Eddie C. Lee
*Assistant Examiner*—John Chizmar
*Attorney, Agent, or Firm*—Deveau, Colton & Marquis

[57] ABSTRACT

The filmless method and printer for making 3D and animation pictures using a digital reflection-type matrix display device such as a digital micro-mirror device to sequentially display a plurality of 2D views, a light source to illuminate the display device to produce a reflected beam, and a projection lens to form an image from the reflected beam and expose it on a lenticular print material. To fill the image area underlying each lenticule on the print material, each 2D view is projected at a different angle. Two methods can be used: 1) In the scanning method, two of the three elements including the display device, the projection lens and the print material are moved to different positions to change the projection angle; 2) In the non-scanning method, the projection lens has a large aperture sufficient for covering the total viewing angle of the lenticules. To change the projection angle, the aperture of the projection lens is partitioned into a plurality of sections so that the image of each 2D view is exposed on the print material through a different aperture section. Preferably, with the non-scanning method, the image displayed on the display device is enlarged and formed on a diffuse screen and the image so formed is then exposed on the print material by the projection lens. The 2D views for making the 3D pictures can be electronically aligned before they are displayed on the display device. Thus, the key subject alignment process during printing is eliminated.

21 Claims, 8 Drawing Sheets

3D PHOTOGRAPHIC PRINTER USING A DIGITAL MICRO-MIRROR DEVICE FOR EXPOSURE

The current application is a Continuation-In-Part application of pending application Ser. No. 08/682,106, filed Jul. 17, 1996, which is a Continuation-In-Part application of application Ser. No. 08/602,663, filed Feb. 16, 1996 now abandoned, and of Ser. No. 08/418,016, filed Apr. 6, 1995, now U.S. Pat. No. 5,572,633, each of which is a Continuation-In-Part of Ser. No. 08/333,201, filed Nov. 2, 1994, now U.S. Pat. No. 5,583,971, which, in turn, is a Continuation-In-Part of Ser. No. 08/001,025, filed Jan. 9, 1993, now abandoned. Ser. No. 08/682,106 is also a Continuation-In-Part application of Ser. No. 08/349,481, filed Dec. 2, 1994, now U.S. Pat. No. 5,625,435 which, in turn, is a Continuation-In-Part application of Ser. No. 08/140,681, filed Oct. 21, 1993, which is now abandoned.

BACKGROUND OF THE INVENTION

Lenticular 3D pictures are composed of a series of 2D views of a scene taken at different viewing angles. During printing, it is essential that all the 2D views are aligned in reference to a common point known as the key-subject in the scene. When using the 2D views recorded on film for printing, one must use a complicated mechanical apparatus to reposition each of the 2D views for key subject alignment before exposing the image onto the lenticular print material. U.S. Pat. No. 5,412,449 (Lam) discloses a single-stage printer for producing 3D pictures from 2D views recorded on film, wherein an optical assembly is used to locate the key subject in each 2D view and a precision mechanical assembly is used to move the film to align the key subject. U.S. Pat. No. 5,026,950 (Fritsch) discloses a dual-stage printer for producing 3D pictures from 2D views recorded on film, wherein an equally complex optical and mechanical assembly is used to align all the 2D views for exposure.

It is desirable to provide a 3D printer in which the key subject in each 2D view is aligned with another either at the time the 2D views are acquired, or after they are digitized and stored in a computer. By doing so, the optical and mechanical means for locating the key subject and repositioning the film during printing are eliminated.

SUMMARY OF THE INVENTION

The filmless method and printer for making 3D pictures, according to the present invention, use a digital reflection-type matrix display such as a digital micro-mirror device to sequentially display a series of 2D images; a light source to illuminate the matrix display for reflection; and a projection lens to refocus the reflected light from the matrix display for sequentially projecting the 2D images each at a different projection angle onto a lenticular print material. The micro-mirror device is electronically connected to a computer workstation which stores the 2D images in digital form and conveys them to the device for displaying. The workstation also controls the movement of various electro-mechanical components of the printer and the printing sequence of the printer. It is understood that the 2D views displayed on the display can be a positive image or a negative image depending upon the optical characteristics of lenticular print material. The displayed image can be a mirror image if required.

The digital micro-mirror device, such as the DMD™ developed by Texas Instruments Technology, consists of a two-dimensional array of micro-mirrors which can be individually controlled to reflect light toward a designated direction for a controlled period of time. The device usually comes with a control board which controls the deflection of each micro-mirror surface in accordance with the pixel intensity of the displayed image. Such a micro-mirror device is capable of displaying an image on command. Because the device is designed for reflection, it requires a directional light source to illuminate the entire array of micro-mirrors. The reflected light beam from the micro-mirrors is directed toward a projection lens which refocus the reflected beam to form an image on the lenticular print material.

The micro-mirror device, like a mirror, does not produce a color image itself Rather, it merely reflects the light beam that illuminates the micro-mirrors. When the micro-mirrors are illuminated by a white light source, the reflected beam can only produce a black-and-white image. In order to print a color 3D picture, each 2D view must be electronically separated into a plurality of color components in RGB (red, green, blue) or CMY (cyan, magenta, yellow) or CMYK (cyan, magenta, yellow and black) and each color component is sequentially displayed for exposure. Preferably, a filter assembly containing three matching color filters (RGB) or (CMY) is disposed about the projection lens to provide a color filter in the projection optical path so that each color component image is exposed through a corresponding filter. With such approach, a single white light source is adequate for illumination.

Alternatively, three light sources separately providing three color light beams can also be used for illumination in a one micro-mirror device (one-chip) system. It should be noted that three digital micro-mirror devices, or three chips, can also be used in 3D color printing, one for each of the primary colors. In a three-chip system, white light can be split into the three primary colors by using a prism system. Three digital micro-mirror devices can be used, one for each of the primary colors. This system requires three chips and has the advantage of improved brightness. A color wheel is not needed with this system.

A two-chip digital micro-mirror display can be used for certain applications. A color wheel is used with the two-chip system but will normally use two of the secondary colors, such as magenta and yellow. The magenta segment of the color wheel allows both red and blue to pass through while the yellow segment passes red and green. This results in the red light constantly passing through the filter system. Red is on all the time, while blue and green alternate with the rotation of the magenta-yellow color wheel, and each are on about half the time. Once the light is through the color wheel, the light is directed to a prism system, which splits off the constant red light and directs it to a digital micro-mirror device that is dedicated to handling red light. The sequential blue and green light is directed to another digital micro-mirror device that is configured to handle the alternating colors.

Preferably, the color and density of the 3D picture is controlled by adjusting the displayed time for each color component image on the device. However, a shutter can also be used to control the exposure time and to keep unwanted light away from the lenticular print material.

In order to fill the image area underlying each lenticule on the print material with different 2D views, each 2D view must be projected onto the print material at a different projection angle. Two methods can be used to change the projection angle: a scanning method and a non-scanning method. The scanning method has been disclosed in application Ser. No. 08/602,663, filed Feb. 16, 1996 and its parent application Ser. No. 08/333,201, filed Nov. 2, 1994, which has been issued as U.S. Pat. No. 5,583,971. In the scanning method, at least two of the elements including the matrix display device, the projection lens and the print material are moved to different positions to change the projection angle. The moving direction is perpendicular to the longitudinal axis of the lenticules on the print material. The non-scanning method has been disclosed in pending application Ser. No. 08/349,481, filed Dec. 2, 1994, which was allowed on Dec. 10, 1996. In the non-scanning method, a large aperture projection lens is used for projection. The relative positions between the projection lens, the matrix display device and the print material are fixed during the entire printing process. In order to change the projection angle, each of the 2D views displayed on the display device is exposed onto the print material through a different section of the projection lens aperture.

The image data to be displayed on the digital matrix display device for exposure can be conveyed from an electronic camera or from a computer workstation or other image input devices. Analog signals are converted to digital signals before an image is conveyed to the digital matrix display device for displaying.

It is advantageous that the camera aims it a fixed point (the key subject) in the scene while acquiring the 2D views of a scene at different viewing angles. By doing so, all the 2D views sequentially displayed on the display device are automatically aligned for projection. When the image data for printing are conveyed from a computer workstation, key subject alignment can be easily performed electronically by shifting the entire images so that the pixel coordinates of the key subject in each 2D view are the same.

The filmless printing method, according to the present invention, can be used for producing 3D pictures or animation pictures on lenticular print material where the photosensitive emulsion is pre-coated on or attached to the lenticular screen. It is understood that a lenticular screen comprises an array of cylindrical lenses, or lenticules. Each lenticule has a longitudinal axis and a substantially identical total viewing angle.

The 2D images that are used to make a 3D picture can be a series of 2D views of a scene. But they can also be 2D views of different scenes or a scene with time changes for producing animation pictures. Furthermore, the 2D views can be acquired by one or more cameras, or they can be generated in a computer. Each of the 2D views can also be a collage of images produced by different devices.

Moreover, a parallax barrier plate can be used in lieu of a lenticular screen for making the print material. A parallax barrier plate which comprises alternate blocking and clear strips is another well-known type of view-separating screen used in producing 3D pictures and animation pictures.

It is an objective of the present invention to provide a method for printing a lenticular picture from a plurality of 2D views without using photographic film to record 2D views.

It is another objective of the present invention to provide a 3D printing method wherein the key-subject alignment between 2D views can be achieved at the time of image acquisition by a camera or in a computer workstation prior to displaying the 2D views for exposure.

It is a further objective of the present invention to provide a printing method capable of making 3D pictures while the 2D views are acquired.

These and other objectives of the present invention will become apparent upon reading the detailed descriptions of the invention.

The digital nature of the digital micro-mirror device enables noise-free, precise image quality with digital gray scale and color reproduction. The digital micro-mirror is more efficient than the transmissive liquid crystal display (LCD) because it is based upon reflection and does not require polarized light. The close spacing of the micromirrors causes the images to be projected as seamless pictures with higher perceived resolution. The hinged mirrors allow the mirrors to tilt between +10° and −10°.

DETAILED DESCRIPTION OF THE INVENTION

Figure 1:
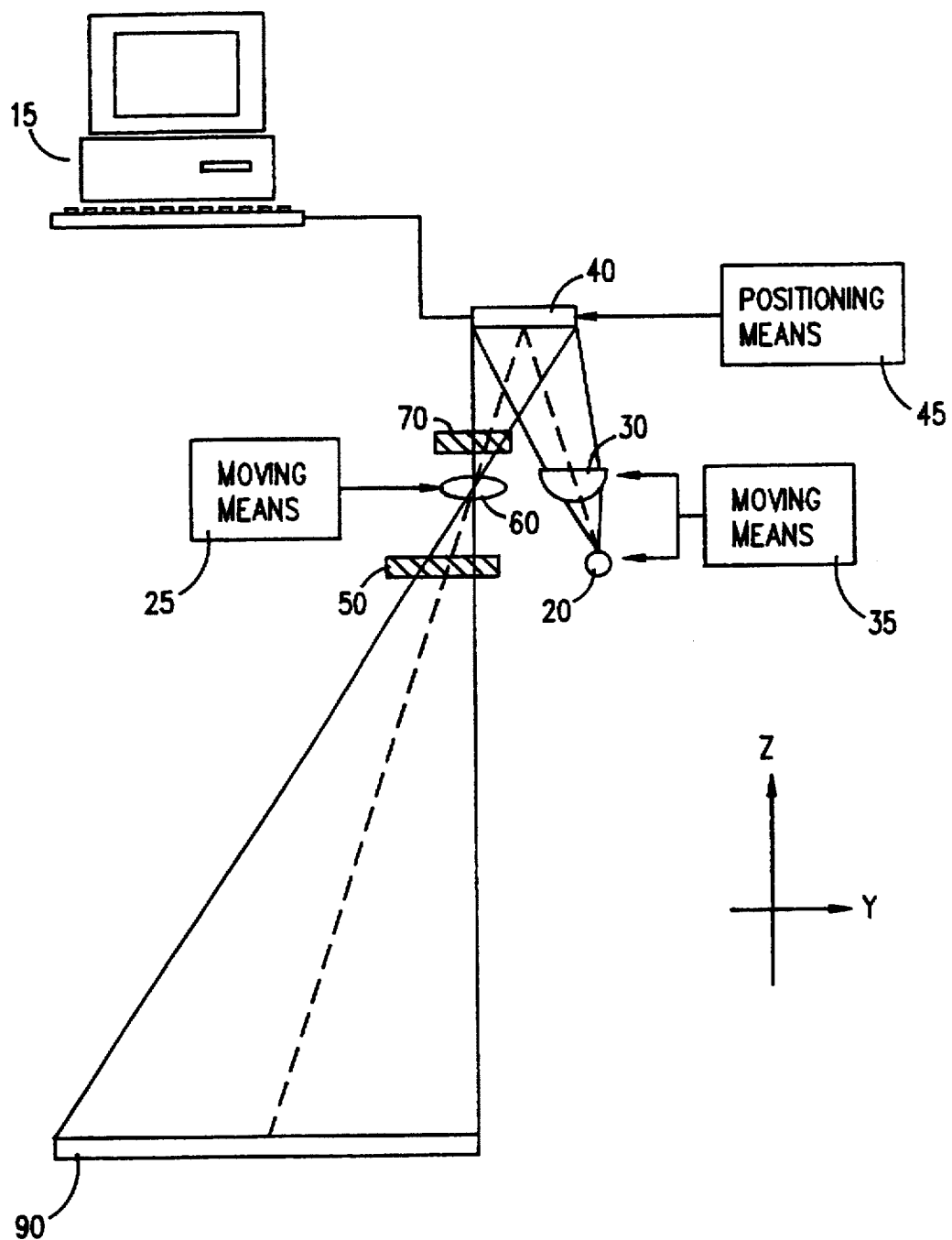
FIG. 1 illustrates the filmless method for printing lenticular pictures composed from a plurality of 2D views in a scanning printer.

FIG. 1 illustrates the filmless method for printing lenticular pictures composed from a plurality of 2D views in a scanning printer, according to the present invention. In FIG. 1, numeral 40 denotes a digital micro-mirror device used for sequentially displaying a series of 2D views for exposure. The micro-mirror device 40 is electronically connected to a computer workstation 15 which receives 2D views from one or more image input devices, and stores 2D views in digital form. The computer workstation is also used to convey the images to the micro-mirror device for exposure and to control the movement of various components in the printer. The computer workstation 15 can be used to electronically align the 2D views in reference to the key subject, if necessary, prior to conveying the 2D views to the micro-mirror device.

Numeral 20 denotes a light source and numeral 30 denotes a condensing lens for shaping the light beam from the light source 20 and directing the light beam toward the micro-mirror device 40 for illumination. When an image is displayed on the micro-mirror device, the reflected beam from the device carries the displayed image. The reflected beam is refocused by a projection lens 60 onto a lenticular print material 90 which is in the image plane of the projection lens 60. Numeral 70 denotes a filter assembly containing a plurality of color filters for color filtration. Numeral 50 denotes a shutter for keeping out unwanted exposure to the print material and for controlling the exposure time, if desired.

In order to change the projection angle, various optical components must be relocated to different positions relative to the print material. As shown in FIG. 1, the micro-mirror device 40 is moved by positioning means 45, the condensing lens 30 and the light source 20 are moved by moving means 35. The projection lens 60, along with the shutter 50 and the filter wheel 70, are moved by moving means 25. It is understood that the lenticular print material can also be relocated to effectively change the projection angle.

Figure 2:
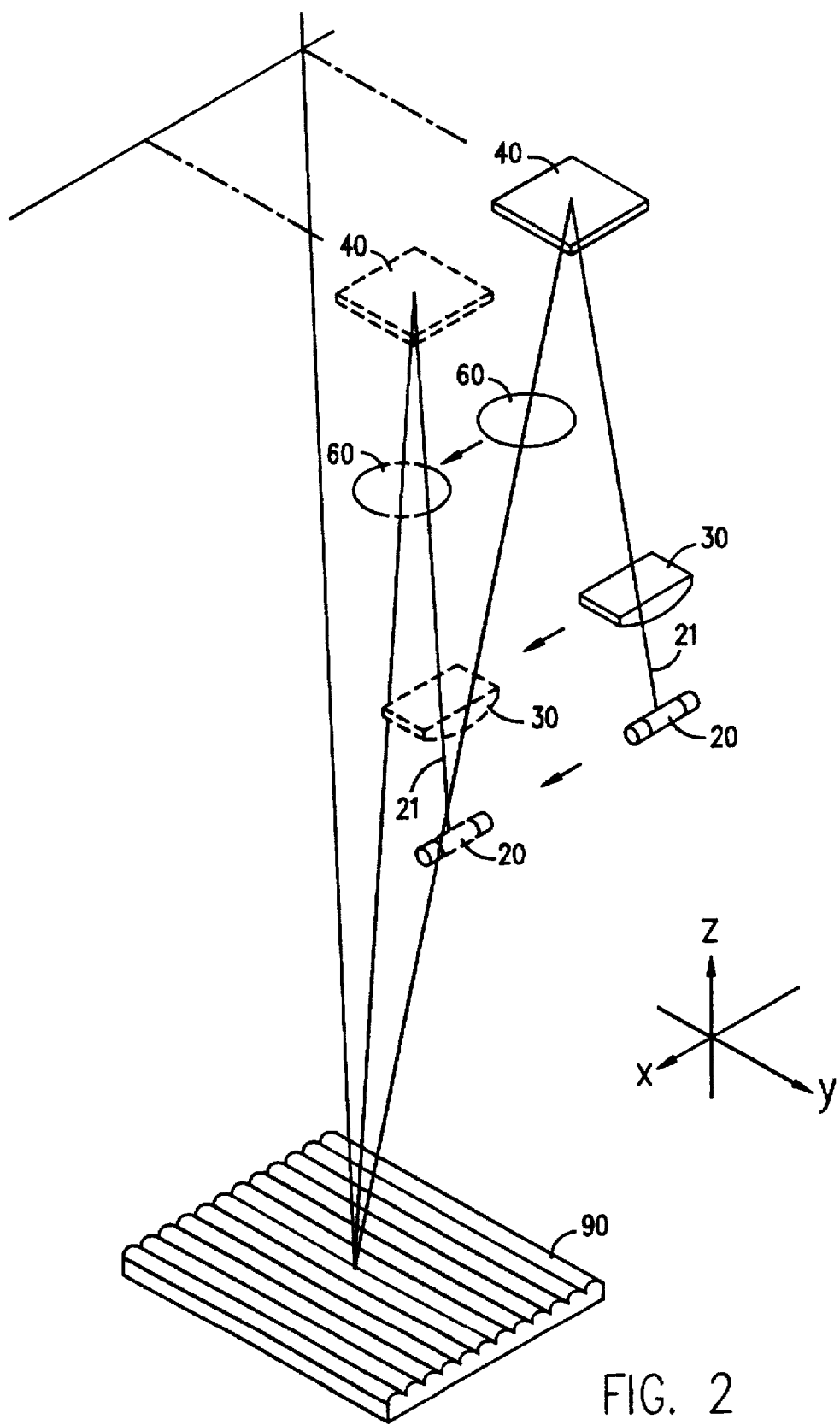
FIG. 2 illustrates the details of the relative positions of various optical components in the filmless printer.

FIG. 2 illustrates the details of the relative positions of various optical components in the filmless printer for changing the projection angle. As shown in FIG. 2, a center portion of light beam 21 from a light source 20 passes through the center of the condensing lens 30, reaching the center of the micro-mirror device 40. The light beam is reflected toward the center of the projection lens 60 onto the center of the print material 90. In order to change the projection angle, all the optical components are laterally shifted along the X axis such that the center light beam 21 from the light source 20 maintains its encounter with the center portions of condensing lens 30, the micro-mirror device 40, the projection lens 60 and the print material 90, regardless of the projection angle. As shown in FIG. 2, the surface of the print material 90 comprises an array of lenticules each having a longitudinal axis. The longitudinal axis of the lenticules is parallel to the Y axis. Thus, the shifting direction for the optical components is perpendicular to the longitudinal axis of the lenticules.

It should be noted that the condensing lens 30 is trimmed to save space in the printer. However, the trimming of the condensing may not be necessary.

Figure 3:
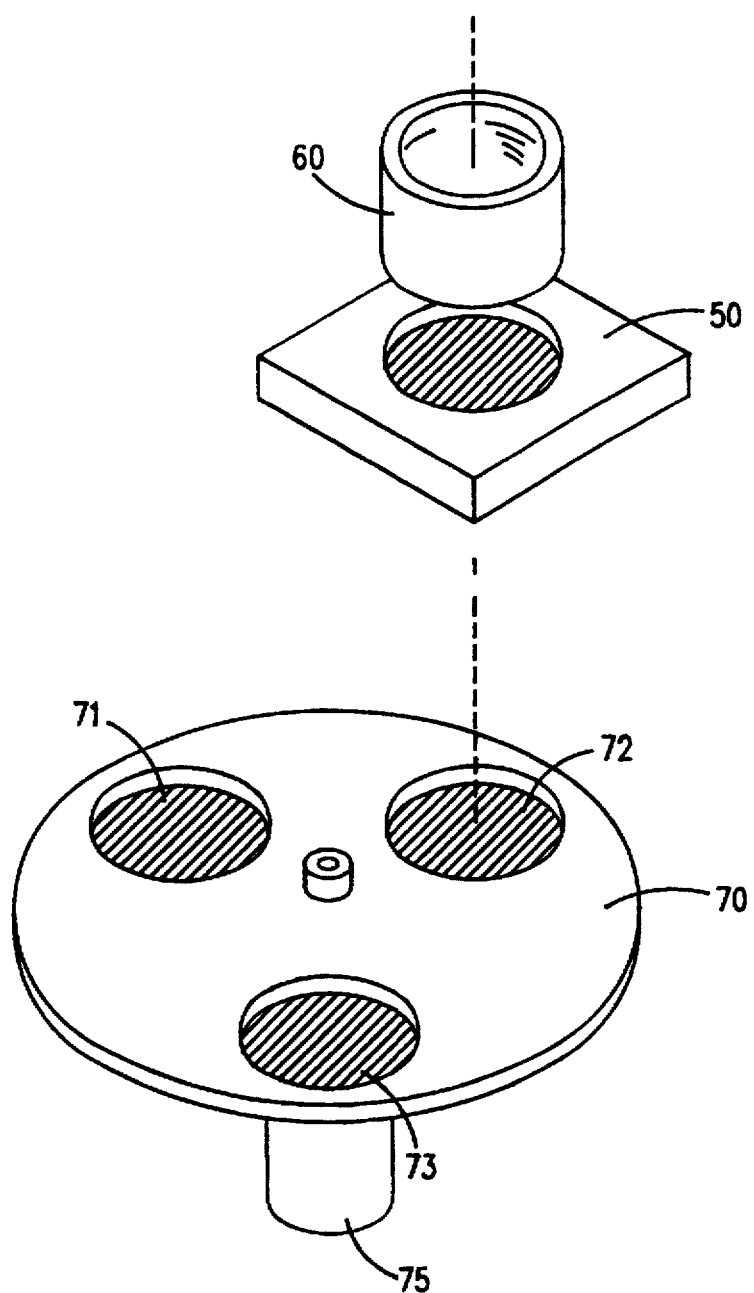
FIG. 3 illustrates a filter wheel for color filtration.

FIG. 3 illustrates a filter assembly for color filtration. As the micro-mirror is not suitable for displaying a color image, each 2D view must be electronically separated into three color components in RGB or CMY and each color component is separately displayed on the micro-mirror device while the micro-mirror device is illuminated by a white light source. At the same time, a corresponding color filter is used to provide the proper color filtration. As 10 shown in FIG. 3, a filter wheel 70 containing three color filters 71, 72 and 73 in RGB or CMY is disposed in front of or behind the projection lens 60. The filter wheel 70 is turned by rotating means 75 to provide a matching color filter for filtering the image of a color component. Preferably, a shutter 50 is used to prevent unwanted light from reaching the lenticular print material. The shutter may be used for exposure control.

Figure 4A:
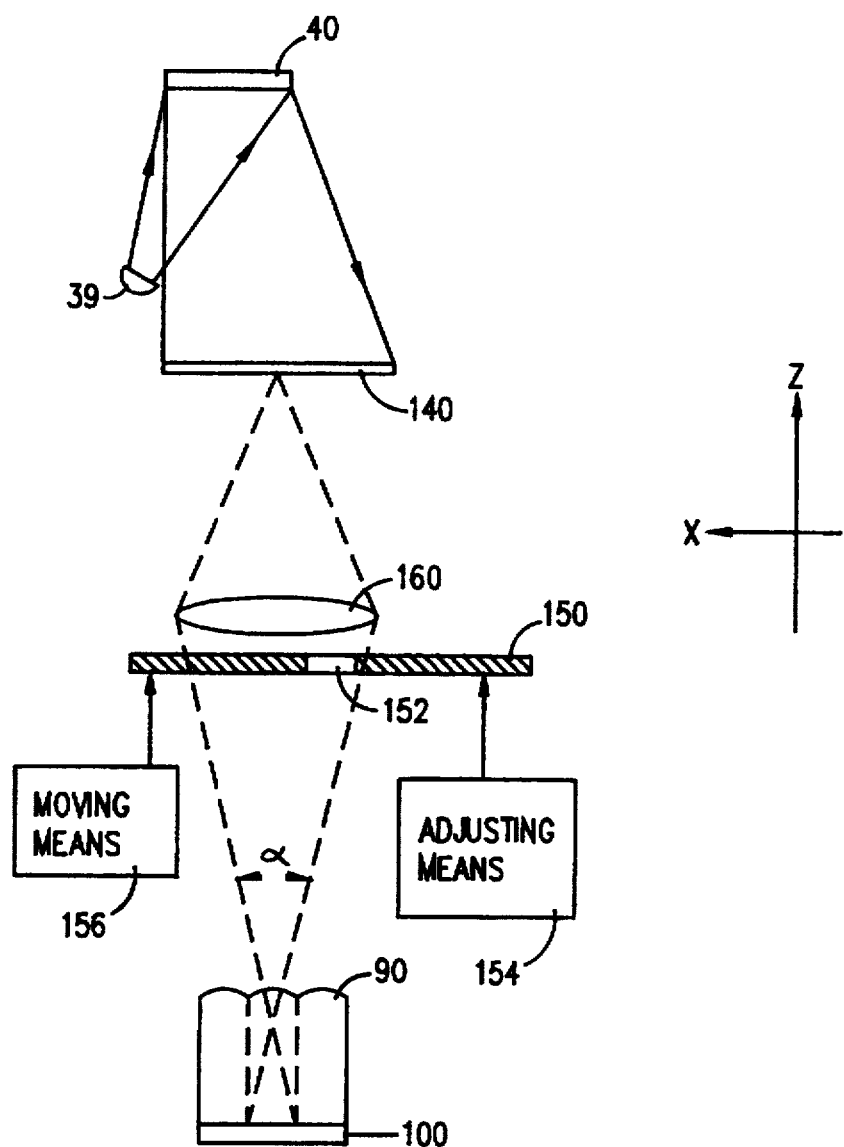
FIG. 4 illustrates the filmless method for printing lenticular pictures composed from a plurality of 2D views in a non-scanning printer.
Figure 4B:
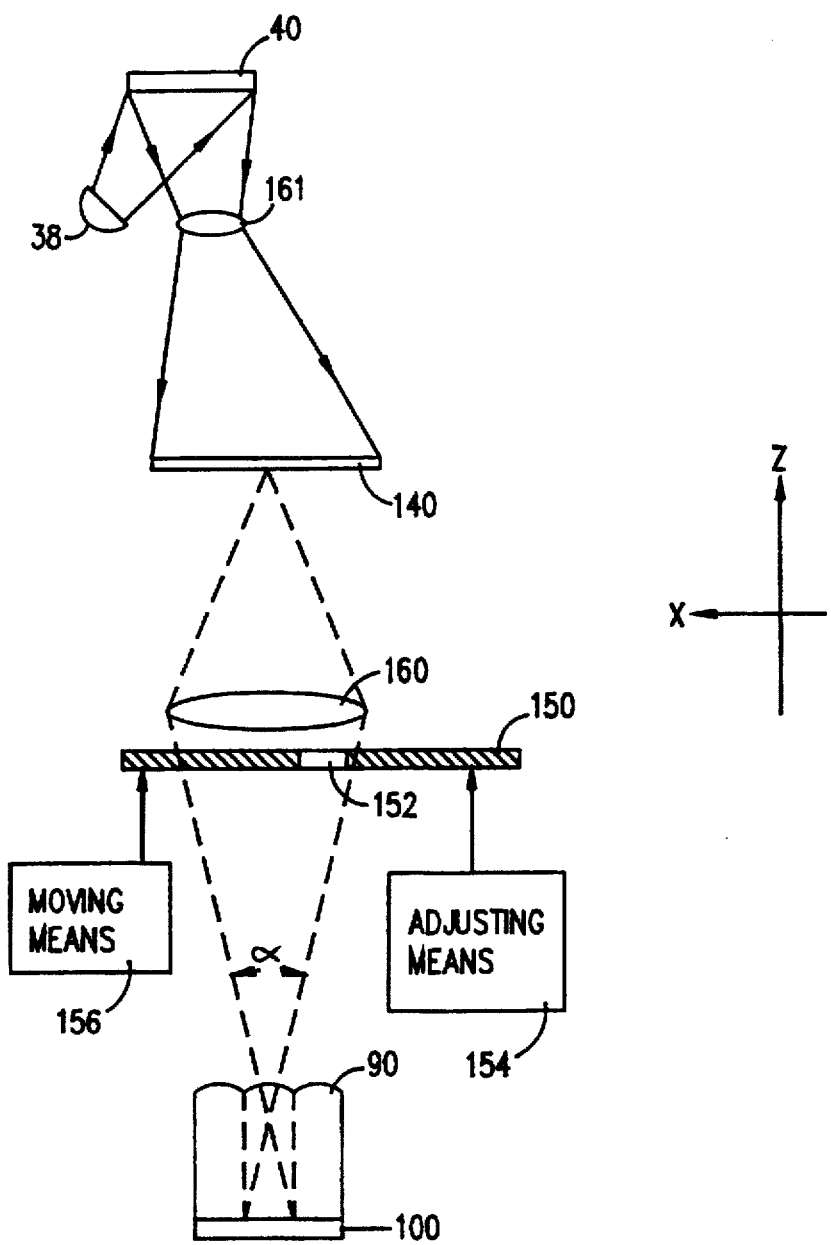

FIGS. 4a and 4b illustrate the filmless method for printing lenticular pictures composed from a plurality of 2D views in a non-scanning printer, according to the present invention. In FIG. 4A, numeral 40 denotes a micro-mirror device used for sequentially displaying a series of 2D views for exposure. The micro-mirror device is illuminated by a directional light source 39. The reflected light beam from the micro-mirror device is directed toward a screen 140 having a diffuse surface so that the image displayed on the micro-mirror device is reproduced on the diff-use surface. The image formed on the diffuse screen 140 is refocused by a large-aperture lens 160 to form an image on a lenticular print material 90. The aperture of the projection lens 160 must be sufficiently large to cover the total viewing angle o of the lenticules on the lenticular screen 90 which is disposed in the image plane of the projection lens 160. The relative positions between the micro-mirror device 40, the diffuse screen 140, the projection lens 160 and the print material 90 are fixed during the entire printing cycle. To make a lenticular picture from a plurality of 2D images which are sequentially displayed on the micro-mirror device, the projection lens 160 projects each 2D image through a different section of the lens aperture. For example, when a lenticular picture is composed from N 2D images, the aperture of the projection lens 160 is effectively partitioned into N sections, where N ranges from 2 to 100 or more. As shown in FIG. 4A, an aperture plate 150 having an opening 152 is used for effectively partitioning the lens aperture as it controls the transmission of light through the lens. The aperture plate 150 is relocated by moving means 156 to select the desired aperture section of the projection lens 160 for exposure. It is understood that the moving direction of the opening 152 is perpendicular to the longitudinal axis of the lenticules on the lenticular print material 90. As shown, the moving direction is parallel to the X axis while the longitudinal axis of each lenticule is perpendicular to the XZ plane. Preferably, the opening 152 is adjusted by adjusting means 154 so that the width of the opening is substantially equal to 1/N of the lens aperture. It should be noted that the width of the opening, however, can be smaller or greater than 1/N of the entire aperture of the projection lens 160 and the shape of the opening 152 can be rectangular or elliptical or any other shape. The shape of the opening may be changed to correct for the uneven exposure on the lenticular print material 90 due to the vignetting of the projection lens 160. Numeral 100 denotes the photosensitive emulsion layer precoated or attached to the backside of the lenticular material 90 for image forming. It is understood that in order to print a color picture from a plurality of 2D images, each 2D image must be electronically separated into a series of color components which are separately displayed on the micro-mirror device and filtered through a matching color filter. All of the color component images of a 2D image are exposed onto the lenticular print material 90 through the same aperture section of the projection lens. The color filters for color filtration are not shown in FIG. 4A.

FIG. 4B illustrates another method of using a micro-mirror device to produce an image. As shown in FIG. 4B, the micro-mirror device 40 is illuminated by a directional light source 38 which provides a collimated beam or a semi-collimated beam. Another projection lens 161 is disposed between the micro-mirror device 40 and the diffuse screen 140 for refocusing the reflected beam from the micro-mirror device 40 to form an image on the diffuse screen 140.

Figure 5A:
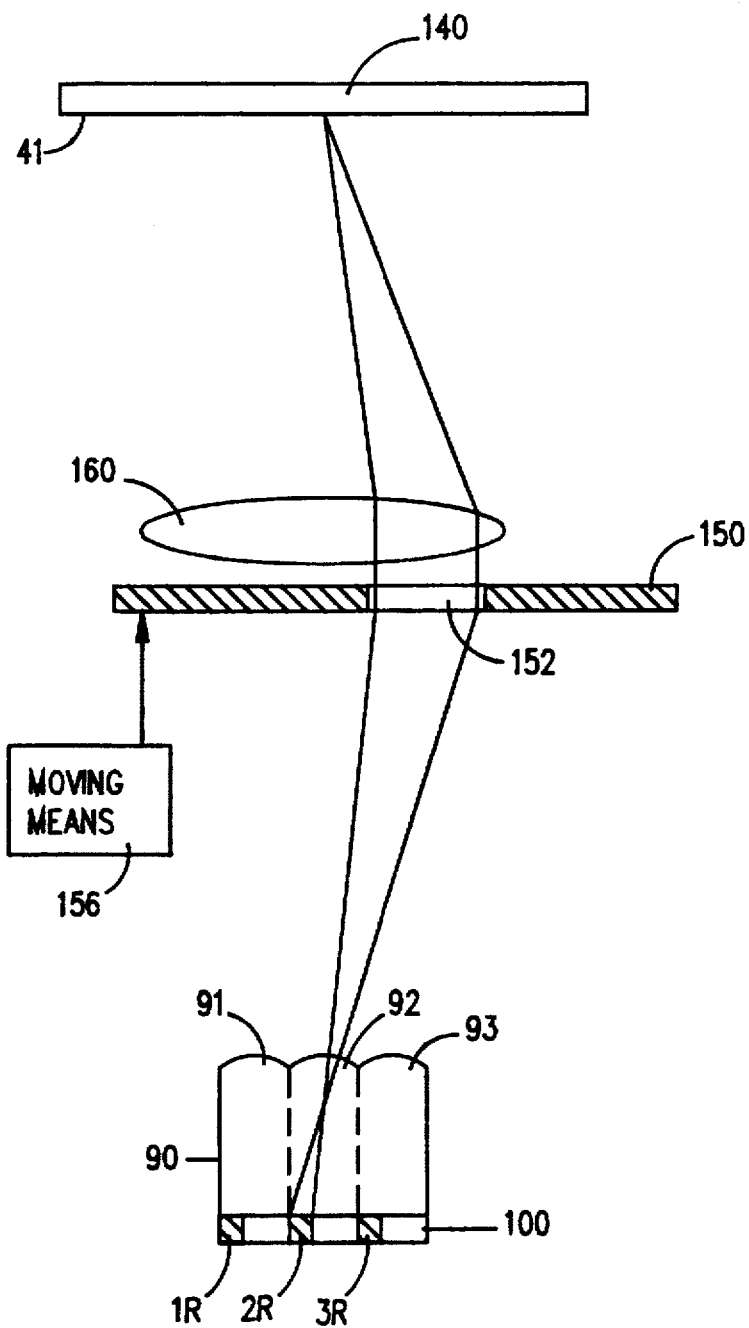
FIG. 5 illustrates how the projection angle is changed in a non-scanning printer.
Figure 5B:
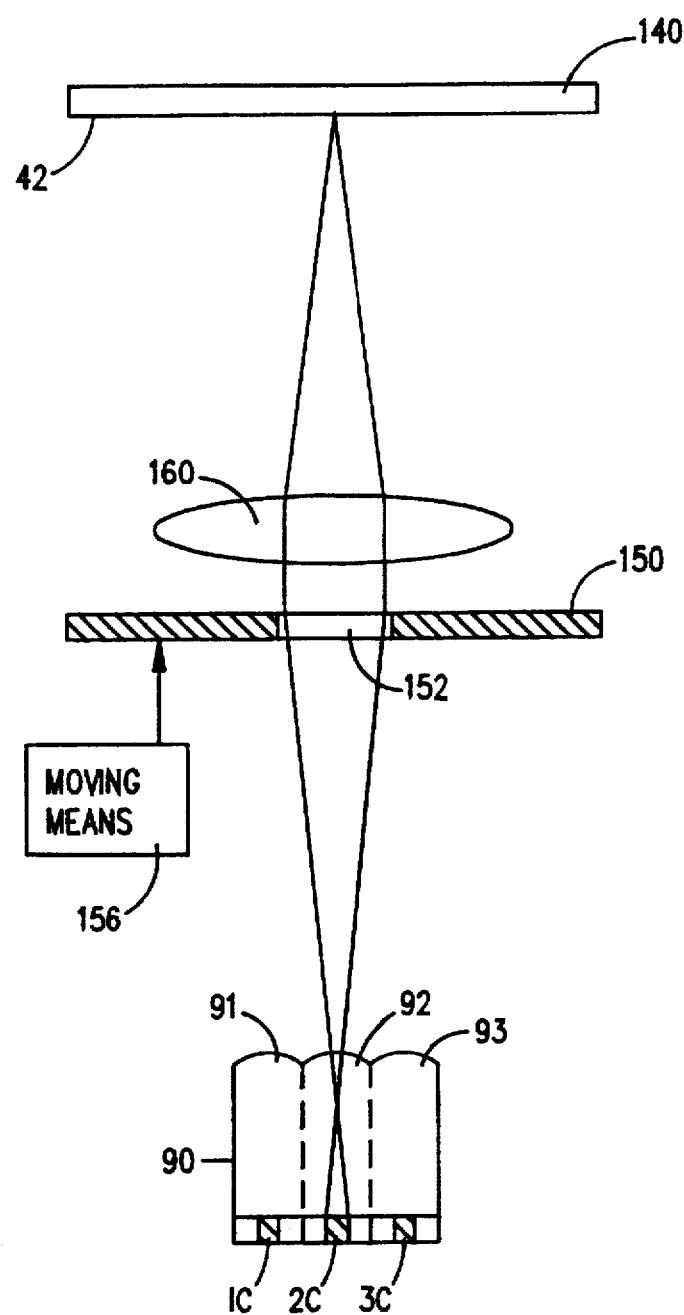
Figure 5C:
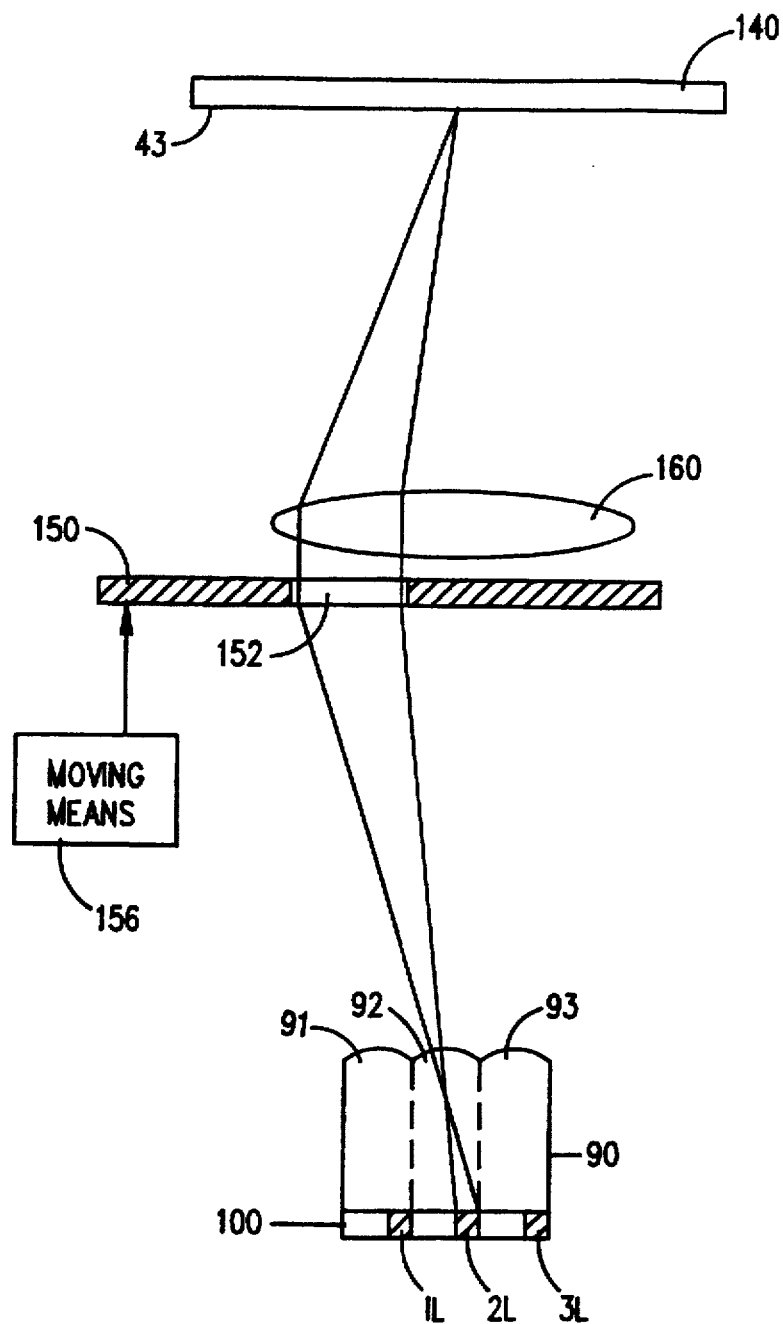

FIG. 5 illustrates how the projection angle is changed in a non-scanning printer. For illustrative purposes only, FIG. 5A to FIG. 5C illustrate a typical sequence used in exposing three 2D views to make a lenticular picture, and only three lenticules 91, 92 and 93 on the surface of lenticular print material 90 are used in the illustration to show the total viewing angle of the lenticules. With N=3, the width of the opening 152 of the aperture plate 150 is substantially equal to 1/3 of the aperture of projection lens 160. The lens aperture is sufficiently large such that the images projected on the print material properly fill the entire area of each lenticule. In FIG. 5A, the aperture plate 150 is located on the right side of the projection lens 160 so that the image 41 of the first 2D view formed on the diff-use screen is projected through the right section of the aperture of the projection lens 160, forming line-form images on the photosensitive emulsion layer 100 under the lenticules. As shown, the width of each line-formed image, 1R, 2R and 3R, is substantially equal to 1/3 of the image area under each lenticule. In FIG. 5B, the aperture plate 150 is moved to the center so that the image 42 of the second 2D view formed on the diffuse screen 140 is projected through the middle aperture section of the projection lens 160, forming line-form images 1C, 2C and 3C under lenticules 91, 92 and 93. In FIG. 5C, the aperture plate 150 is moved to the left side of the projection lens 160 so that the image 43 of the third 2D view formed on the diffuse screen 140 is projected through the left aperture section, forming line-form images 1L, 2L and 3L under lenticules 91, 92 and 93. As each line-form image fills 1/3 of the area under each lenticule, the images of all three 2D views properly fill the entire image area under the lenticules.

While the present invention has been disclosed in reference to the preferred embodiments, it shall be understood by those skilled in the art that various changes, modifications and substitutions may be incorporated into such embodiments without departing from the spirit of the invention as defined by the claims appearing hereafter.

What is claimed is:

1. A filmless printing method for producing 3D and animation pictures from a plurality of 2D views on a lenticular print material comprising a multiplicity of lenticules, said method comprising the steps of:

(a) sequentially displaying said 2D views on a digital reflection-type matrix display means, said matrix display means being illuminated by a light source to produce a reflected light beam carrying the image of the displayed 2D view; and (b) refocusing said reflected light beam by a projection lens so as to expose the image of the displayed 2D view on said lenticular print material, said print material being effectively relocated at different positions relative to said projection lens and in the image plane of said projection lens so as to allow the image of each 2D view to be exposed on said print material at a different projection angle.

2. The method of claim 1 wherein said digital matrix display means is at least one digital micro-mirror device.

3. The method of claim 2 in which said digital matrix display means is a single digital micro-mirror device with a color filter separating the light from the light source into three color components for transmission to the digital micro-mirror device in sequence.

4. The method of claim 2 wherein said digital matrix display means is three digital micro-mirror devices with light from the light source being split into three colors each of which is directed continuously to one of the digital micro-mirror devices.

5. The method of claim 2 wherein said digital matrix display means is two digital micro-mirror devices in which one of the digital micro-mirror devices has a color filter for separating two colors and the other digital micro-mirror device uses a beam-splitting prism between the light source and the digital micro-mirror devices.

6. The method of claim 1 further comprising the steps of moving at least two of the group of elements consisting of the matrix display means, the projection lens and the lenticular print material to desired locations for changing the projection angle while maintaining said projection lens in proper focus on said matrix display means and said lenticular print material.

7. The method of claim 1 further comprising the step of acquiring a plurality of 2D views of a scene to be displayed on the digital matrix display means for producing a picture by aiming an electronic camera at an object in the scene, said aiming being performed to keep the object in proper registration for subsequent printing of the picture, said electronic camera acquiring images of the scene at different viewing angles by the relative movement between the electronic camera and the object while the camera is being aimed at said object, said aiming and the relative movement of said camera and object automatically maintaining the object in proper registration.

8. The method of claim 1 wherein said 2D views are stored in a computer as digital files, each of said 2D views having a key subject image, said method further comprising the steps of electronically obtaining the location of the key subject image in each of said 2D views from the stored digital files and electronically shifting said 2D views so as to align each 2D view with another 2D view in reference to the key subject image in each 2D view prior to displaying said 2D views in Step (a) of claim 1.

9. A filmless printing method for producing 3D and animation pictures from a plurality of 2D views on a lenticular print material comprising a multiplicity of lenticules each having a longitudinal axis and a total viewing angle, said method comprising the steps of:

(a) sequentially displaying said 2D views on a digital reflection-type matrix display means, said matrix display means being illuminated by a light source to produce a reflected light beam carrying the image of the displayed 2D view;

(b) forming the image carried in said reflected beam on a diffuse screen; and (c) refocusing the image formed on said diffuse screen by a projection lens so as to expose the image of the displayed 2D view on said lenticular print material disposed in the image plane of said projection lens, said projection lens having a large aperture sufficient for covering the total viewing angle of said lenticules with said images, said lens aperture being partitioned into a plurality of sections along an axis perpendicular to the longitudinal axis of said lenticules, said aperture sections being selected for transmitting light rays from the image formed on said diffuse screen so as to expose the image of each of said 2D views through a different aperture section.

10. The method of claim 9 wherein said matrix display means comprises at least one digital micro-mirror device.

11. The method of claim 9 further comprising the step of acquiring a plurality of 2D views of a scene to be displayed on the digital matrix display means for producing a picture by aiming an electronic camera at an object in the scene, said aiming being performed to keep the object in proper registration for subsequent printing of the picture, said electronic camera acquiring images of the scene at different viewing angles by the relative movement between the electronic camera and the object while the camera is being aimed at said object, said aiming and the relative movement of said camera and object automatically maintaining the object in proper registration.

12. The method of claim 11 wherein said 2D views are stored in a computer as digital files, with each of said 2D views having a key subject image, said method further comprising the steps of electronically obtaining the location of the key subject image in each of said 2D views from the stored digital files, and electronically shifting said 2D views so as to align each 2D view with another 2D view in reference to the key subject image prior to displaying said 2D views in Step (a).

13. The method of claim 9 wherein the image on said screen is formed by a second lens disposed between said matrix display means and said diffuse screen.

14. A filmless printer for producing 3D and animation pictures from a plurality of 2D views on a lenticular print material, said printer comprising:

(a) a digital reflection-type matrix display means for sequentially displaying said 2D views;

(b) a light source for illuminating said matrix display means to produce a reflected light beam carrying the image of the displayed 2D view; and (c) a projection lens for refocusing said reflected light beam so as to expose the image of the displayed 2D view onto said lenticular print material disposed in the image plane of said projection lens.

15. The filmless printer of claim 14 wherein said matrix display means comprises at least one digital micro-mirror device.

16. The filmless printer of claim 14 further comprising means for effectively relocating said projection lens and said digital matrix display means to different locations relative to said lenticular print material while maintaining said projection lens in proper focus on said matrix display means and said print material so as to expose the image of each of said 2D views at a different projection angle on said lenticular print material.

17. The filmless printer of claim 14 further comprising means for storing and receiving said 2D views.

18. A filmless printer for producing 3D and animation pictures from a plurality of 2D views on a lenticular print material having a multiplicity of lenticules each having a longitudinal axis and a total viewing angle, said printer comprising:

(a) a digital reflection-type matrix display means for sequentially displaying said 2D views;

(b) means for illuminating said matrix display means to produce a reflected light beam carrying the image of the displayed 2D view;

(c) a diffused screen disposed in the light path of said reflected light beam so as to allow the image carried in said reflected light beam to be formed on said diffuse screen;

(d) a projection lens for refocusing the image formed on said diffuse screen so as to expose the image of the displayed 2D view onto said lenticular print material disposed in the image plane of said projection lens, said projection lens having a large aperture sufficient for covering the total viewing angle of said lenticules with said images; and (e) means for partitioning the aperture of said projection lens into a plurality of aperture sections along an axis perpendicular to the longitudinal axis of said lenticules; and means for selecting said aperture sections so as to allow the image of each of said 2D views is exposed onto said lenticular print material through a different aperture section.

19. The filmless printer of claim 18 wherein said digital matrix display means comprises at least one digital micromirror device.

20. The filmless printer of claim 18 further comprising means for storing and receiving said 2D views.

21. The filmless printer of claim 18 further comprising a second lens disposed between said digital matrix display means and said screen for forming on said screen the image carried in the reflected beam.

* * * * *